United States Patent Office.

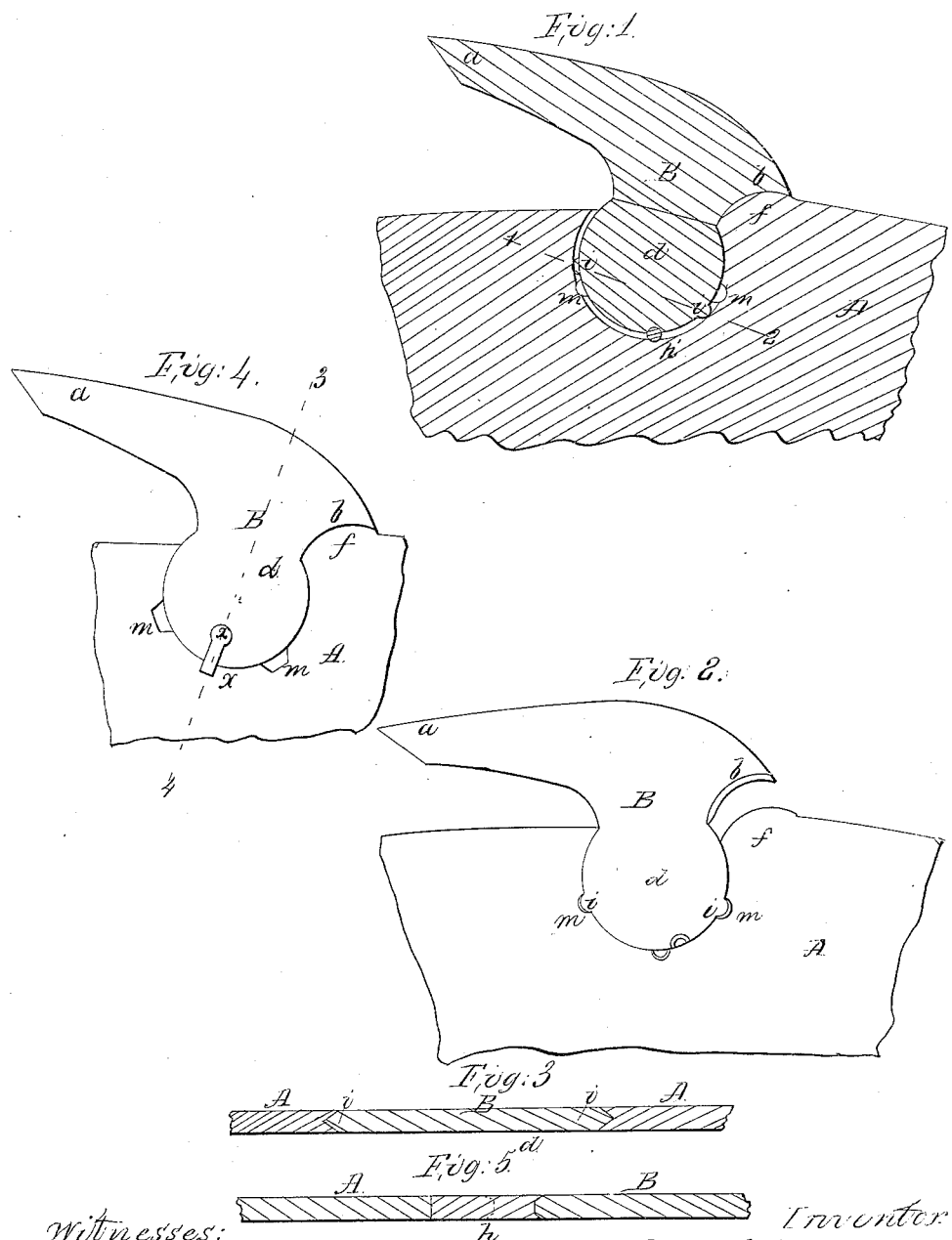

CHARLES DISSTON, OF PHILADELPHIA, PENNSYLVANIA.

Letters Patent No. 63,486, dated April 2, 1867.

IMPROVEMENT IN SAWS.

The Schedule referred to in these Letters Patent and making part of the same.

TO ALL WHOM IT MAY CONCERN:

Be it known that I, CHARLES DISSTON, of Philadelphia, Pennsylvania, have invented certain improvements in Saws with Detachable Teeth; and I do hereby declare the following to be a full, clear, and exact description of the same, reference being had to the accompanying drawing, and to the letters of reference marked thereon.

My invention consists in the mode described hereafter of securing detachable teeth to the blades of saws, whereby the necessity of the expensive fitting and tedious manipulation required in other modes of attaching detachable teeth is obviated.

In order to enable others skilled in the art to make my invention, I will now proceed to describe the manner of constructing the same. On reference to the accompanying drawing, which forms a part of this specification—

Figure 1 is a sectional view of part of a saw with a detachable tooth.

Figure 2, an exterior view, illustrating the mode of applying the tooth.

Figure 3, a transverse section on the line 1–2, fig. 1, drawn to an enlarged scale.

Figure 4, a modification; and

Figure 5, a transverse section on the line 3–4, fig. 4, drawn to an enlarged scale.

Similar letters refer to similar parts throughout the several views.

A represents part of the blade of a circular or other saw, to which the teeth have to be secured, and B is one of the teeth, which consists of the cutting projection $a$, the curved projection $b$, and the circular projection $d$. In the edge of the projection $d$ is a recess, $x$, which is enlarged at the inner end, as shown in fig. 4, this enlarged portion being countersunk on both sides for a purpose described hereafter. The blade of the saw is placed on the bed of an ordinary drilling machine, and holes corresponding in number and position to the teeth required are drilled in the blade so near the edge that the drill shall project beyond the latter, the edge of the hole being thus only the segment of a circle. By a suitable tool in the same drilling machine a groove is formed in the edge of each hole to receive V-shaped lips, $i$ $i$, on the edge of the circular projection $d$ of the tooth, this projection being of exactly the same diameter as the hole in the blade of the saw, measured on the outer surface of the same. In the edge of each hole are cut recesses, $x'$ and $m$, there being as many of the latter as there are lips on the projection $d$, so that when the tooth is in the position shown in fig. 2, it may be fitted laterally to the hole, the lips passing into the said recesses $m$. After the circular projection, $d$, of the tooth has been thus placed in the hole, the tooth is drawn back to the position shown in fig. 1, so that its curved projection, $b$, may be brought to bear against the rounded portion, $f$, of the blade, the recess $x$ being brought opposite the recess $x'$, and the V-shaped lips $i$ taking their places in the V-shaped groove in the edge of the hole in the blade, to which the tooth is now confined. Additional lateral security is afforded by making the under side of the curved projection, $b$, V-shaped, to correspond to a V-shaped groove in the rounded portion, $f$, of the blade. After the tooth has been thus fitted and confined to the blade, a metal block or rivet, $h$, which will fit accurately the two openings $x$ $x'$ is inserted in the latter, and the portion fitting the enlarged end of the opening $x$ is riveted on both sides, so that the block is confined firmly in its place, and the tooth is prevented from turning without the necessity of inserting a rivet in the saw-blade. In place of the block or rivet $h$, a small hole may be drilled partly in the edge of the tooth and partly in the edge of the hole in the blade, this hole being countersunk on both sides, so that a rivet, $h'$, may be fitted in it without projecting above the surface of the saw. The tooth is now perfectly secure, but can be removed readily after withdrawing the rivet and forcing the tooth forward to the position shown in fig. 2.

The above-described mode of securing detachable teeth to saws possesses the great advantage of demanding much less tedious manipulation in fitting the teeth than other modes heretofore used, in which the recesses in the blades for receiving the teeth are bounded by straight edges or in part only by curved or rounded edges. This advantage will be readily understood by those familiar with the ease and accuracy with which the simple operation of drilling is accomplished, and with the perfect appliances which are used in modern machine shops.

The lips $i$ may be on the edge of the opening in the blade, and recesses and grooves may be made in the edge of the projection $d$.

I do not claim a saw tooth having its base formed on a circular line and fitting a recess in the saw-blade, but I claim as my invention, and desire to secure by Letters Patent—

The lips $i$ on the edge of the projection $d$ of a saw tooth or on the edge of a recess in the blade, in combination with a groove, and recesses $m$ in the projection or in the blade, substantially as specified.

In testimony whereof I have signed my name to this specification in the presence of two subscribing witnesses.

CHAS. DISSTON.

Witnesses:
 CHAS. E. FOSTER,
 W. J. R. DELANY.